US008211536B2

(12) United States Patent
Rha et al.

(10) Patent No.: US 8,211,536 B2
(45) Date of Patent: Jul. 3, 2012

(54) COMPOSITE SOLID SURFACE ARTICLE COMPRISING AT LEAST ONE OF RANDOMLY SHAPED FIBERS AND POWDER PARTICLES

(75) Inventors: Do Choon Rha, Seoul (KR); Eung Seo Park, Yeosu-si (KR); Jae Wook Juen, Seoul (KR)

(73) Assignee: Cheil Industries Inc., Gumi-si (KR)

( * ) Notice: Subject to any disclaimer, the term of this patent is extended or adjusted under 35 U.S.C. 154(b) by 1154 days.

(21) Appl. No.: 11/296,948

(22) Filed: Dec. 8, 2005

(65) Prior Publication Data

US 2006/0121264 A1    Jun. 8, 2006

(30) Foreign Application Priority Data

Dec. 8, 2004  (KR) .................. 10-2004-0102861

(51) Int. Cl.
*B32B 27/04* (2006.01)
(52) U.S. Cl. ............... 428/297.4; 428/298.4; 428/300.4; 428/397; 428/399; 428/400
(58) Field of Classification Search .................. None
See application file for complete search history.

(56) References Cited

U.S. PATENT DOCUMENTS

| 3,043,796 | A | * | 7/1962 | Novak et al. .................. 523/457 |
| 5,259,872 | A | * | 11/1993 | Shinozaki et al. ......... 106/18.11 |
| 5,269,991 | A | | 12/1993 | Gueret |
| 5,935,879 | A | * | 8/1999 | Helwig et al. .................. 442/59 |
| 6,114,007 | A | * | 9/2000 | Brandon et al. .............. 428/141 |
| 2001/0050032 | A1 | * | 12/2001 | Dry ................................ 106/677 |
| 2002/0168503 | A1 | * | 11/2002 | Dong et al. .................... 428/195 |

FOREIGN PATENT DOCUMENTS

| JP | 09-002857 A | 1/1997 |
| JP | 12-128601 A | 5/2000 |
| JP | 2000128601 | 5/2000 |
| JP | 13-192469 A | 7/2001 |
| KR | 10-1999-0039632 A | 6/1999 |
| KR | 10-2004-0059913 A | 7/2004 |
| WO | 2006/062362 A1 | 6/2006 |

OTHER PUBLICATIONS

Skyliter Mesh Size and Micron Conversion Chart: http://www.skylighter.com/fireworks/making-fireworks-projects/screen-mesh-metal-particle-size.asp. Copyright 2010.*
International Search Report in counterpart International Application No. PCT/KR2005/004199, dated Mar. 3, 2006.

* cited by examiner

*Primary Examiner* — David Sample
*Assistant Examiner* — Nicole Gugliotta
(74) *Attorney, Agent, or Firm* — Summa, Additon & Ashe, P.A.

(57) ABSTRACT

The invention relates to a composite solid surface article. More particularly, the invention relates to a composite solid surface article containing fibers and polymeric powder particles. A composite solid surface article may comprise a matrix of at least one polymeric resin, randomly-shaped fibers dispersed in the matrix, wherein the article comprises a substantially smooth surface with a viewable pattern formed by one or more ingredients of the composite solid surface article, the viewable pattern comprises at least part of the randomly-shaped fibers.

22 Claims, 5 Drawing Sheets

COMPOSITE SOLID SURFACE ARTICLE COMPRISING AT LEAST ONE OF RANDOMLY SHAPED FIBERS AND POWDER PARTICLES

BACKGROUND

1. Field of the Invention

The invention relates to a composite solid surface article. More particularly, the invention relates to a composite solid surface article containing fibers and polymeric powder particles.

2. Description of Related Technology

Recently, composite solid surface materials have become popular for kitchen and bathroom countertops and for many other uses. The composite solid surface materials are also referred to as artificial or synthetic marble as they substitute and mimic the patterns of natural stone such as marble or granite. Conventional artificial marble has certain limitations in providing various patterns.

Generally, the artificial marble is produced by curing a resin mixture, which include inorganic filler, pigments, curing agents, dispersing agents and resin syrup. To improve the appearance of the artificial marble, solid particles such as crushed artificial marble chips are often added to the resin mixture. Typically, artificial marble chips having a size of about 0.1-5 mm are used for this purpose.

SUMMARY OF THE INVENTION

One aspect of the invention is a composite solid surface article, comprising a matrix of at least one polymeric resin; and randomly-shaped fibers dispersed in the matrix, wherein at least some of the randomly-shaped fibers have a length from 1.5 to 10 cm, and wherein the article comprises a substantially smooth surface with a viewable pattern formed by one or more ingredients of the composite solid surface article, the viewable pattern comprises at least part of the randomly-shaped fibers. In some embodiments the composite solid surface article comprises at least one of an inorganic filler and a pigment.

In some embodiments, the randomly-shaped fibers are generally uniformly distributed in the matrix. In embodiments, at least some of the randomly-shaped fibers have a length from about 0.1 cm to about 7 cm. In other embodiments, at least some of the randomly-shaped fibers have a length from about 2.5 cm to about 5 cm. The randomly shaped fibers may have generally different lengths among themselves. The thickness of the randomly-shaped fibers is not limited, but some embodiments have a thickness ranging from about 0.001 mm to about 0.1 mm.

In some embodiments, the randomly-shaped fibers are not aggregated together. There may be at any given time in the composite solid surface article, a higher concentration of fibers. In some embodiments, the randomly-shaped fibers are not interwoven. In others, the randomly-shaped fibers are not interwoven together. This does not preclude the interweaving of fibers because they are randomly dispersed; some fibers may interweave with others as is often demonstrated by fiber materials. Another embodiment is a composite solid surface article, wherein the randomly shaped fibers are randomly and locally networked in the matrix. Aggregations of randomly-shaped fibers are possible.

At least some of the randomly shaped fibers may have one or more colors that are substantially different from a color of a background surrounding the at least some of the randomly-shaped fibers. In embodiments, at least some of the randomly-shaped fibers have a color that is substantially similar but not identical to a color of a background surrounding the at least some of the randomly-shaped fibers.

In embodiments of the composite solid surface article, some may further comprising comprise powder particles having particle sizes from about 100 to about 150 mesh. At least some of the powder particles comprise a polymeric resin, an inorganic filler and a pigment.

In some embodiments, the article comprises the polymeric resin in an amount from about 100 parts by weight and the randomly-shaped fibers in an amount from about 0.001 to about 10 parts by weight. The composite solid surface article may further comprise a filler, wherein the article comprises the filler in an amount from about 100 to about 200 parts by weight and the randomly-shaped fibers in an amount from about 0.001 to about 10 parts by weight. The composite solid surface article may also comprise solid particles dispersed in the polymeric resin matrix, the particles having a particle size from about 0.1 mm to about 0.15 mm, wherein at least some of the particles are formed of a material comprising a polymer and an inorganic filler.

Some embodiments are a structure comprising a composite solid surface article and a support on which the article is installed. The structure may be selected from the group consisting of a building, a kitchen, a kitchen island, a bathroom, a table, a desk, a workstation, an interior wall of a building and an exterior wall of a building.

Other embodiments include a method of making a composite solid surface article, the method comprising providing a resin syrup comprising at least one polymerizable compound, providing randomly-shaped fibers, mixing the resin syrup and randomly-shaped fibers to form an article forming mixture, polymerizing the polymerizable compound, molding the article forming mixture into a shape, and curing the shaped article forming mixture, thereby forming a composite solid surface article.

Another embodiment is a method of installing a composite solid surface article, the method comprising providing a composite solid surface article, cutting the article to a desired shape, placing the article on a supporting structure, and bonding the article to the supporting surface.

In embodiments, a composite solid surface article may comprise a matrix of a polymeric resin, a filler dispersed in the matrix, and particles dispersed in the matrix, the particles having a particle size from about 0.1 mm to about 0.15 mm, wherein at least some the particles are formed of a material comprising a polymer and an inorganic filler. An article may comprise the polymeric resin in an amount of about 100 parts by weight and the particles in an amount from about 0.1 to about 50 parts by weight. The article may also comprise the filler in an amount from about 100 to about 200 parts by weight and the particles in an amount from about 0.1 to about 50 parts by weight.

In some embodiments, the polymeric resin comprises at least one acrylic polymer. In some of these, the acrylic polymer resin comprises a polymer or a copolymer from one or more compounds selected from the group consisting of methyl methacrylate, ethyl methacrylate, iso-propyl methacrylate, n-butyl methacrylate and 2-ethylhexyl methacrylate.

In some embodiments, the article comprises a substantially smooth surface with a viewable pattern formed by one or more ingredients of the composite solid surface article, the viewable pattern comprises a number of fine spots created by the particles sized from about 0.1 mm to about 0.15 mm. The fine spots may be generally uniformly distributed on the pattern. In some embodiments, at least some of the fine spots may have a color different from a color of a background surrounding the at least some of the fine spots. At least some of the fine spots have a color that is substantially similar but not identical to a color of a background surrounding the at least some of the fine spots. In other embodiments, the article may further comprise solid particles having a particle size substantially larger than the particles.

DETAILED DESCRIPTION OF THE PREFERRED EMBODIMENT

Figure 1:
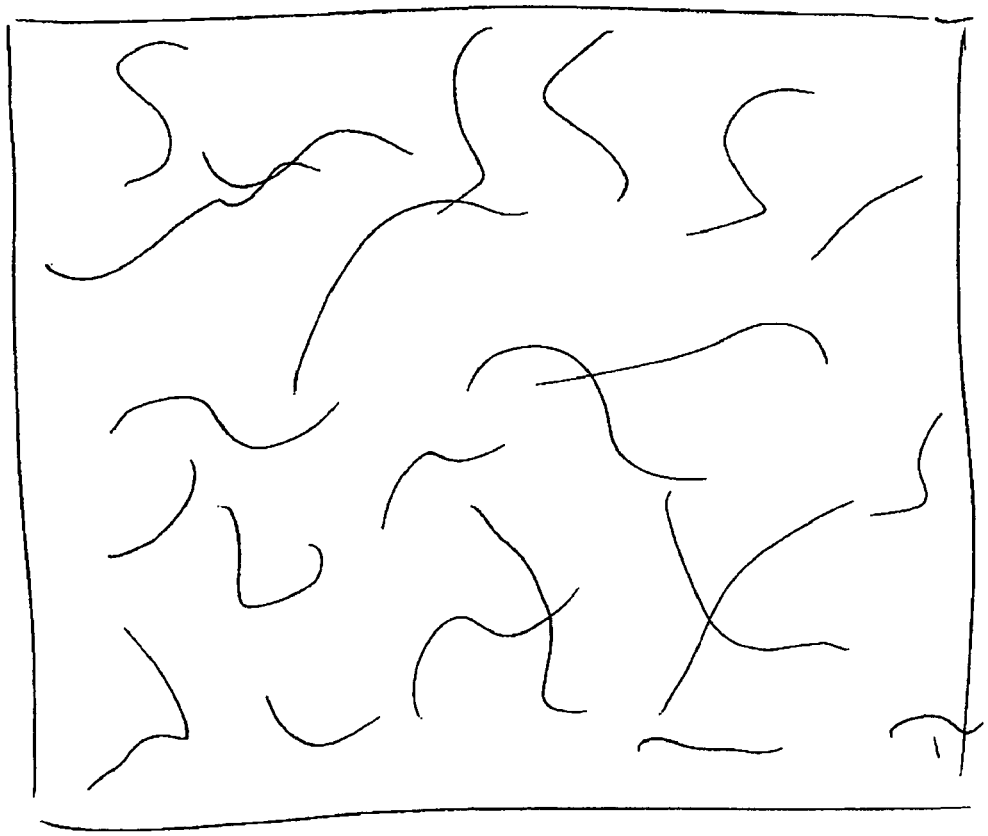
FIG. 1 illustrates a pattern of a composite solid surface article containing randomly shaped fibers randomly dispersed in a matrix.

Conventional artificial marble compositions and methods have certain limitations in reproducing the patterns exemplified in natural stones such as marble, granite, quartz, feldspar, and other stones and minerals. In addition, there is a present interest in obtaining other patterns in such artificial marble compositions. In some embodiments, the inventors have developed artificial marble with a fiber pattern. In some embodiments, the fiber pattern resembles traditional Korean Hanji paper.

The artificial marble produced according to various embodiments of the invention provides one or more solid surfaces. The solid surface of the artificial marble can be formed flat or curved. The artificial marble can be shaped into almost any form, shape or structure by molding, machining or any other appropriate processing, which can be readily appreciable by one of ordinary skill in the art. The artificial marble with one or more solid surfaces has a lot of applications. The artificial marble can be used as a material for a kitchen countertop, a bathroom countertop, a workstation countertop, etc. Also, the artificial marble can be used as a building material for interior walls, exterior walls, floors or tiles. As such, embodiments of the invention includes an artificial marble countertop supported by a structure or frame, a building or house containing an artificial marble surface as a wall, a floor or a countertop, etc. One of ordinary skills in the art will be able to appreciate other applications of the artificial marble produced by various embodiments of the invention.

In one embodiment, a composite solid surface article comprises a matrix of at least one polymeric resin and randomly-shaped fibers. The composite solid surface article may further include a filler, a pigment, etc. Some embodiments of the composite solid surface article may resemble the natural stone like appearance of some of the aforementioned stones, including marble and granite, and may also mimic the appearance of a fiber pattern such as that in traditional Korean Hanji paper.

In another embodiment, the composite solid surface article includes a matrix of a polymeric resin and polymeric particles having particle sizes from about 100 to about 150 mesh. The matrix of the composite solid surface article may further comprise solid particles having a particle size from about 0.1 mm to about 0.15 mm. In embodiments, the matrix contains at least one acrylic resin comprising polymerized compounds, (meth)acrylate monomers, or optionally comprises one or more acrylic polymers. The matrix can be cured and molded to any extent.

In one embodiment, a composition for producing the composite solid surface article includes a resin syrup and randomly-shaped fibers. The composition may further include solid particles having a particle size from about 0.1 mm to about 0.15 mm, a filler, and/or a pigment.

In another embodiment, a composition for producing the composite solid surface article include a resin syrup and polymeric particles having particle sizes from about 0.1 mm to about 0.15 mm. The composition may further include a filler and/or a pigment.

In embodiments of the invention, the polymeric resin syrup may comprise one or more polymerizable compounds, (meth)acrylate monomers, or optionally comprises one or more acrylic polymer compounds. The polymer is not limited to a polymer formed from the (meth)acrylate monomer. For example, the polymer of the matrix of the at least one acrylic resin comprises a polymer or a copolymer of one or more compounds selected from the group consisting of methyl methacrylate, ethyl methacrylate, iso-propyl methacrylate, n-butyl methacrylate, 2-ethylhexyl methacrylate, combinations thereof, and copolymers thereof. Generally, any (meth)acrylate compound may be used to form the acrylic polymer or serve as the (meth)acrylate monomer. (Meth)acrylate includes both methacrylates and acrylates. Examples of the (meth)acrylate monomer include methacrylic acid esters such as methyl methacrylate, ethyl methacrylate, i-propyl methacrylate, n-butyl methacrylate, 2-ethylhexyl methacrylate, and so forth.

The acrylic resin syrup may comprise any combination of monomer to polymer. In one embodiment, the acrylic polymer is less than 65% by weight and the (meth)acrylate monomer is equal to or less than 35% by weight of the total based on the monomer and polymer component totaling 100% by weight.

The polymerizable compound(s) of the resin syrup polymerizes upon initiation, for example, during production of the composite sold surface article. The polymerization results in a matrix of a polymeric resin.

FIG. 1 is a schematic illustration of an embodiment of a composite solid surface article comprising randomly-shaped fibers randomly dispersed in the matrix. As is shown, the fibers may visibly overlap, contact each other, or be separate from one another. Fibers which visibly overlap are fibers which may be observed by an ordinary observer of a surface of the composite solid surface. Although the fibers may not touch, they may appear to overlap. This is usually due to the transparency of the acrylic resin, resin, and/or fillers. The fibers may be uniformly dispersed in the matrix; however, at any one place, there may be a higher concentration of the fibers in the matrix. The fibers may have random shapes as is also shown in the figure.

In embodiments, the fiber may include natural fiber such as a fiber for preparing a cloth, or a synthetic or regenerated fiber. Some of the fibers that may be used include, coconut husk, cotton, hemp, linen, silk, wool, and so forth. Other examples of synthetic fibers include polyester, polyamide, polyurethane, acrylic fiber, and so forth.

In one embodiment, a composition for producing a composite solid surface article comprises a syrup of an acrylic resin, randomly-shaped fibers having a length of about 0.1 to about 7 cm, about 0.1 to about 50 parts by weight of polymeric particles having particle sizes of about 100 to about 300 mesh; and about 100 to about 200 parts by weight of an inorganic filler. Some embodiments may comprise about 80 to about 120 parts by weight of a matrix of at least one acrylic resin, and more preferably about 90 to about 110 parts by weight of the matrix, and even more preferably 100 parts by weight of the matrix.

In embodiments, randomly-shaped fibers may be randomly dispersed in the composite solid surface article. There may be a higher concentration of fibers at any given location within the solid surface article. Thus, the fibers may be heterogeneously dispersed in the composite solid surface article. The amount of mixing or kneading of compositions prior to molding may more uniformly distribute the randomly-shaped fibers for a more dilute pattern in the composite solid surface article. In embodiments, some fibers may be closer to a surface of the composite solid surface article. Some of these randomly-shaped fibers may be visible to an ordinary observer of a surface of the composite solid surface article. However, the visible randomly-shaped fibers may or may not contact the surface because the acrylic resin and/or other additives may be at least partially transparent such that an observer could view the fibers below the surface of the composite solid surface article.

In embodiments, the randomly-shaped fibers may contact one another, or overlap. In other embodiments, the randomly-shaped fibers may form a random and local network of fibers. In embodiments, randomly-shaped fibers comprise thread-like flecks on a surface of the composite solid surface article. Patterns formed by the thread-like flecks may resemble any pattern. The thread-like flecks may be randomly dispersed such that there is not a repeating pattern. Instead, the pattern is likely one which is random. "Pattern" may also be defined as a resemblance of a natural material appearance. For example, one embodiment of the composite solid surface article has a Hanji paper pattern.

When observing some embodiments, the pattern produced by randomly-shaped fibers in the composite solid surface article randomly-shaped fibers may resemble overlapping hair follicles, wherein long, thin strands with no particular shape are randomly placed on top of and beside other long thin strands with no particular shape.

In embodiments, the length of the randomly-shaped fibers may range from about 0.1 to about 7 cm, and may include fibers with a length of about 1.0, 1.2, 1.4, 1.5, 1.6, 1.8, 2.0, 2.2, 2.4, 2.6, 2.8, 3.0, 3.2, 3.4, 3.6, 3.8, 4.0, 4.2, 4.4, 4.6, 4.8, 5.0, 5.2, 5.4, 5.6, 5.8, 6.0, 6.2, 6.4, 6.6, 6.8, and 7.0 cm. The length of the randomly-shaped fibers may also include fibers having a length of about 7 to about 10 cm. Some embodiments have randomly-shaped fibers dispersed in the matrix, wherein the randomly-shaped fibers have a length of about 3 cm. The diameter of the fiber used in the present invention is not particularly limited.

Based upon the 100 parts by weight of the matrix of at least one acrylic resin, embodiments of the compositions and articles may include about 0.001 to about 10 parts by weight of randomly-shaped fibers. The amount of randomly-shaped fibers may depend on the desired pattern that is to be produced in the composite solid surface article. Some embodiments may include about 0.001, 0.005, 0.01, 0.05, 0.1, 0.5, 1, 1.5, 2, 2.5, 3, 3.5, 4, 4.5, 5, 5.5, 6, 6.5, 7, 7.5, 8, 8.5, 9, 9.5, 10, 11, 12, 13, 14, 15, 16, 17, 18 19 or 20 parts by weight of the randomly-shaped fibers.

Figure 2:
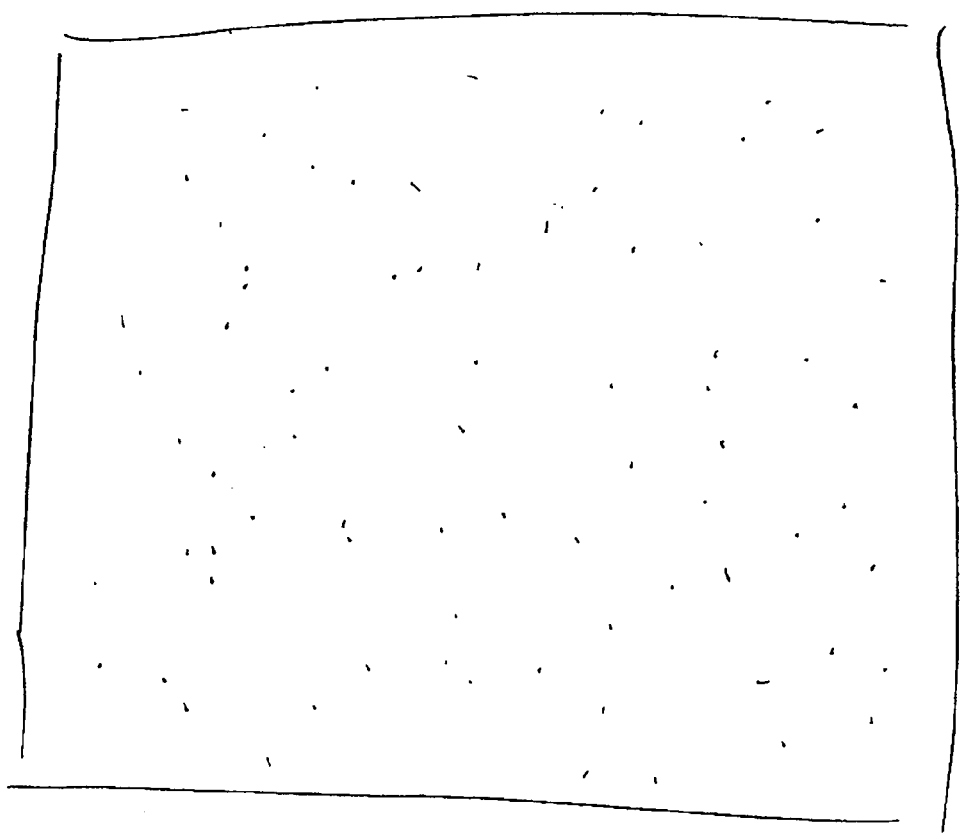
FIG. 2 illustrates a pattern of a composite solid surface article containing solid particles dispersed in a matrix having particle sizes from 0.1 mm to 0.15 mm.

FIG. 2 illustrates a pattern of a composite solid surface article having solid particles sized from about 0.1 mm to about 0.15 mm dispersed in the matrix. These particles are small, but are still visible to the eye and may form natural stone patterns such as marble with the matrix. The colors of the matrix and the particles may be the same or different; and the colors of the particle may be the same or different as other particles dispersed in the matrix. There can also be a contrast with the filler. The particles are dispersed throughout the matrix, and are sometimes uniformly dispersed.

In some embodiments, the polymeric particles are heterogeneously dispersed in the composite solid surface article to produce a natural stone like effect. In embodiments, the polymeric particles may be colored such that there is a contrast between the matrix of at least one acrylic resin, thereby resembling the contrasting tones produced in natural stones. The polymer particles may also produce a grainy appearance and texture in the composite solid surface article. The artificial marble appearance that may be produced by the polymeric particles may be aesthetically pleasing to an average person as the surface pattern of the artificial marble may look more natural as can be found in, for example, coarse-grained texture of granite.

At least part, if not most or all, of the polymeric particles has one or more colors contrasting with the background thereof, which surrounds the polymeric particles. The color of the background may be controlled by the color(s) of the filler, pigments or the polymeric matrix. In one embodiment, at least some of the polymeric particles have one or more colors substantially different from the color(s) of their surrounding. In another embodiment, at least part of the marble chips polymeric particles has one or more colors that are similar to the color(s) of their surrounding and substantially different tone from that of their surrounding.

In some embodiments, the polymeric particles are of another or the same artificial marble. In the alternative, natural stone particles may be used.

The polymeric particles may be formed of an acrylic resin matrix and an inorganic filler. Some embodiments of the polymeric particles additionally comprise a cross linking agent. Examples of the cross-linking agent include, but are not limited to, polyfunctional (meth)acrylate such as ethylene glycol di(meth)acrylate, propylene glycol di(meth)acrylate, glycerol tri(meth)acrylate, trimethylolpropane tri(meth)acrylate, bisphenol A di(meth)acrylate, etc. The polymeric particles may additionally comprise a polymerization initiator. The polymerization initiators may include, but are not limited to, those describe above. Polymeric particles having a size that can pass through a sieve having about 100 to about 300 mesh may be prepared in any way that is well known in the art, including, but not limited to, pulverizing a mixture comprising a matrix of at least one acrylic resin and an inorganic filler.

In some embodiments, the polymeric particles may have a particle size or diameter ranging from about 100 to about 150 mesh. The polymeric particles have particle sizes such that the particles can pass through a sieve having about 100, 105, 110, 120, 130, 150, 170, 185, 200, 215, 230, 250, 270, 285, or 300 mesh. Some embodiments comprise particles which are substantially the same size. These embodiments may produce a different surface pattern than embodiments with particles of different sizes. Some embodiments may comprise particles of two or more substantially similar sizes to deliver a contrast in a surface pattern. There are many foreseeable embodiments of the mixtures of the particles size that can be used to achieve the desired natural stone appearance and/or pattern.

In some embodiments, the particle size or diameter of the particles may be about 0.1 mm to about 0.15 mm. In some embodiments, particles have a size of about 0.1, 0.11, 0.12, 0.13, 0.14, 0.15 mm. Other embodiments may have particle sizes smaller and larger than this range depending on the application.

Based upon the 100 parts by weight of the matrix of at least one acrylic resin, embodiments of the compositions and articles may include about 0.1 to about 50 parts by weight of polymeric particles. The amount of polymeric particles may depend on the desired pattern that is to be produced in the composite solid surface article. Some embodiments may include about 0.01, 0.05, 0.1, 0.5, 1.0, 1.5, 2.5, 5, 7.5, 10, 12.5, 15, 20, 25, 30, 40, and 50 parts by weight of polymeric particles.

Figure 3:
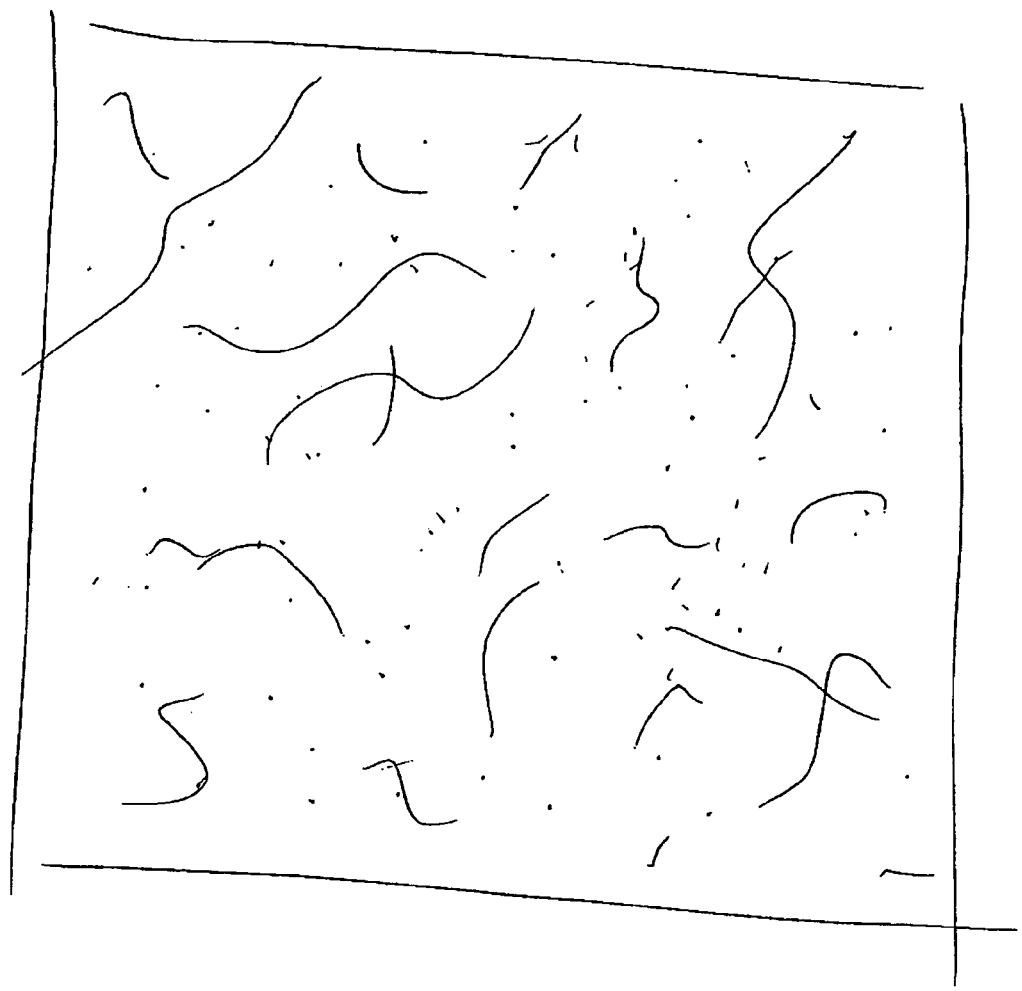
FIG. 3 represents an embodiment of a composite solid surface article with particles and randomly-shaped fibers randomly dispersed in the article.

FIG. 3 illustrates a pattern of a solid surface composite article including a matrix, randomly-shaped fibers randomly dispersed throughout the matrix, and solid particles sized from about 0.1 mm to about 0.15 mm. The combination may combine to form a marbleized finish on a solid surface article with an addition fiber pattern, which in some embodiments may resemble traditional Korean paper.

In embodiments of the invention, the composite solid surface article or the composition for making a composite solid surface article may further comprise an inorganic filler, a pigment, a polymerization initiator, a dispersing agent, etc. Examples of the inorganic filler are calcium carbonate, aluminum hydroxide, silica, alumina, barium sulfate, magnesium hydroxide, etc. In one embodiment of the invention, aluminum hydroxide can be used to provide transparent and elegant appearance of the artificial marble. Examples of the polymerization initiator are benzoyl peroxide, lauroyl peroxide, butyl hydroperoxide, cumene hydroperoxide, other peroxide compounds, azobisisobutylonitrile, other azo compounds and the like. One of ordinary skill in the art will appreciate appropriate any other materials for use in the matrix Based upon the 100 parts by weight of the matrix of at least one acrylic resin, one embodiment may include about 100 to about 200 parts by weight of an inorganic filler. The appropriate inorganic filler and amount used can be determined by a skilled artisan based on the desired application and pattern of the composite solid surface article. Some fillers may be colored as to produce a contrast between the other components of the solid surface article.

Further, conventional artificial marble chips, other than those of the polymeric particles, with various colors may be optionally added. Such particles may have particle sizes from 0.1 mm to 5 mm. In another embodiment, such particles may have sizes from about 0.1 mm to about 1.0 mm. The additional particles may be added in an amount of 0 to 100 pats by weight per 100 parts by weight of acrylic resin syrup to provide an artificial marble with various patterns.

The artificial marble of the present invention can be prepared by a conventional method. All the components and additives are mixed together to obtain a slurry of artificial marble. Then the slurry is poured into a molding cell, followed by curing to form artificial marble product.

In some embodiments, the method of producing a marbleized surface pattern in a composite solid surface article includes mixing polymeric particles and a polymeric syrup to form a mixture and thereafter molding the mixture to a predetermined shape and cure to form a composite solid surface article. In some embodiments, randomly-shaped fibers may be added in addition to or in the alternative to the polymeric particles.

The invention is further described in terms of the following example which is intended for the purpose of illustration and not to be construed as in any way limiting the scope of the present invention, which is defined by the claims. In the following example, all parts and percentage are by weight unless otherwise indicated.

Example 1

Figure 4:
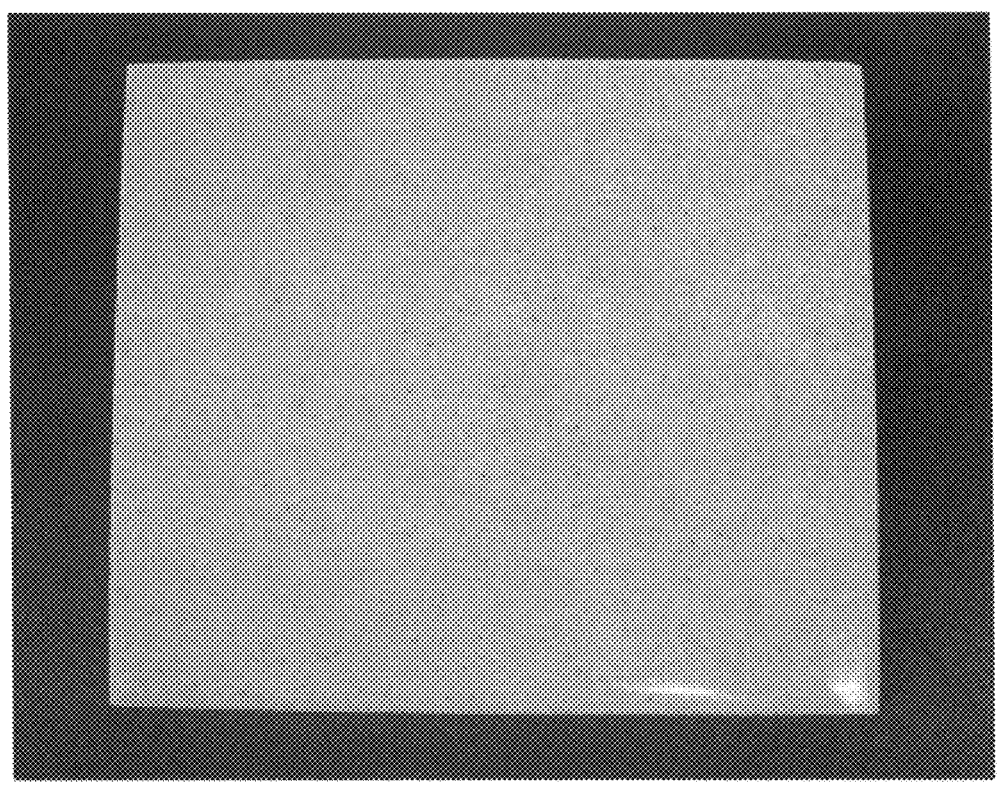
FIG. 4 is a photograph of a composite solid surface article in the form of a flat plate.
Figure 5:
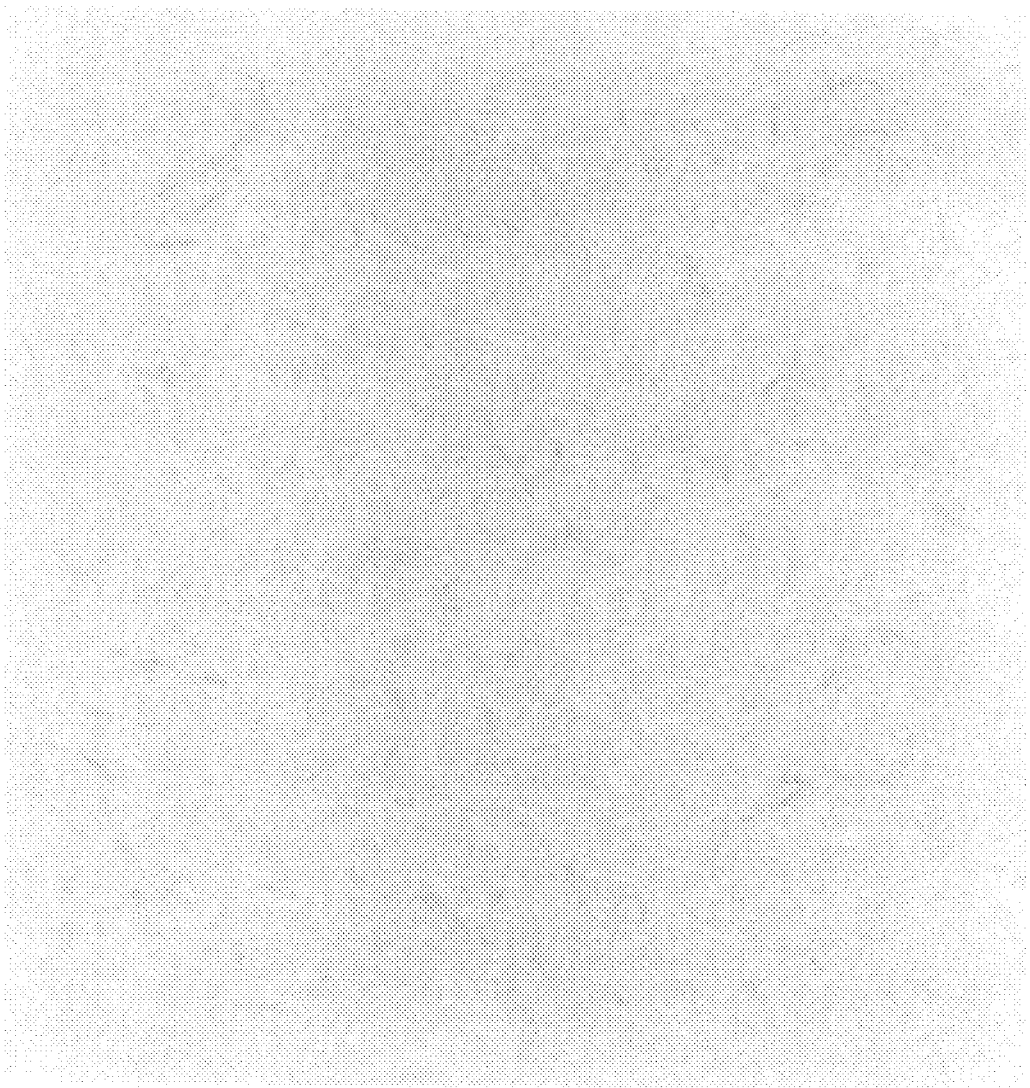
FIG. 5 is a photograph of another composite solid surface article.

Preparation of a Composite Solid Surface Flat Plate: 100 parts by weight of a matrix of a methyl methacrylate resin consisting of a mixture of 30% of poly methyl methacrylate and 70% of the acrylate monomer, methyl methacrylate, 0.01 part by weight of polyester fibers having a length of 3 cm and a thickness of 0.001 mm, 45 parts by weight of polymeric particles having a 120 mesh, 120 parts by weight of aluminum hydroxide as inorganic filler and 2 parts by weight of lauroyl peroxide were mixed, and stirred by a mixer to obtain a mixed slurry. The mixed slurry was poured into a molding cell, and then cured to obtain a composite solid surface article in the form of flat plate. The resulting artificial marble has an elegant pattern which resembles a Korean traditional mulberry paper. The photograph of the artificial marble product was shown in FIG. 4. FIG. 5 is a photograph of a solid surface article made by a similar method.

What is claimed is:

1. A composite solid surface article, comprising:
a continuous polymeric resin matrix;
randomly-shaped fibers dispersed in the continuous polymeric resin matrix, wherein at least some of the randomly-shaped fibers have a length from 1.5 to 10 cm, and
powder particles having particle sizes from about 100 to about 150 mesh dispersed in the continuous polymeric resin matrix,
wherein the article comprises a substantially smooth surface with a viewable pattern formed by one or more ingredients of the composite solid surface article, wherein the viewable pattern comprises at least part of the randomly-shaped fibers and wherein the powder particles are polymeric particles.

2. The composite solid surface article of claim 1, further comprising at least one of an inorganic filler and a pigment.

3. The composite solid surface article of claim 1, wherein the randomly-shaped fibers are generally uniformly distributed in the matrix.

4. The composite solid surface article of claim 1, wherein at least some of the randomly-shaped fibers have a length from about 0.1 cm to about 7 cm.

5. The composite solid surface article of claim 4, wherein at least some of the randomly-shaped fibers have a length from about 2.5 cm to about 5 cm.

6. The composite solid surface article of claim 1, wherein at least some of the randomly-shaped fibers have a length from about 2 cm to about 7 cm.

7. The composite solid surface article of claim 1, wherein the randomly-shaped fibers have generally different lengths among themselves.

8. The composite solid surface article of claim 1, wherein the randomly-shaped fibers have a thickness from about 0.001 to about 0.1 mm.

9. The composite solid surface article of claim 1, wherein generally the randomly-shaped fibers are not aggregated together.

10. The composite solid surface article of claim 1, wherein generally the randomly shaped fibers are not interwoven.

11. The composite solid surface article of claim 1, wherein the randomly shaped fibers are randomly and locally networked in the matrix.

12. The composite solid surface article of claim 1, wherein at least some of the randomly-shaped fibers have one or more colors that are substantially different from a color of a background surrounding the at least some of the randomly-shaped fibers.

13. The composite solid surface article of claim 1, wherein at least some of the randomly-shaped fibers have a color that is substantially similar but not identical to a color of a background surrounding the at least some of the randomly-shaped fibers.

14. The composite solid surface article of claim 1, wherein at least some of the powder particles comprise a polymeric resin, an inorganic filler and a pigment.

15. The composite solid surface article of claim 1, wherein the article comprises the polymeric resin in an amount of about 100 parts by weight and the randomly-shaped fibers in an amount from about 0.001 to about 10 parts by weight.

16. The composite solid surface article of claim 1, further comprising a filler in an amount from about 100 to about 200 parts by weight and wherein the article comprises the randomly-shaped fibers in an amount from about 0.001 to about 10 parts by weight.

17. A structure comprising:
the composite solid surface article of claim 1; and
a support on which the article is installed.

18. The structure of claim 17, wherein the structure is selected from the group consisting of a building, a kitchen, a kitchen island, a bathroom, a table, a desk, a workstation, an interior wall of a building and an exterior wall of a building.

19. The composite solid surface article of claim 1, wherein the polymeric particles comprise a polymeric resin matrix and inorganic filler.

20. The composite solid surface article of claim 19, wherein the polymeric particles comprises an acrylic polymeric resin matrix and inorganic filler.

21. The composite solid surface article of claim 1, wherein the continuous polymeric resin matrix comprises an acrylic polymer resin matrix and wherein said powder particles comprise polymeric powder particles formed of an acrylic polymeric resin and inorganic filler.

22. The composite solid surface article of claim 21, wherein the randomly-shaped fibers comprise synthetic fibers.

* * * * *

UNITED STATES PATENT AND TRADEMARK OFFICE
CERTIFICATE OF CORRECTION

PATENT NO. : 8,211,536 B2  Page 1 of 1
APPLICATION NO. : 11/296948
DATED : July 3, 2012
INVENTOR(S) : Do Choon Rha et al.

It is certified that error appears in the above-identified patent and that said Letters Patent is hereby corrected as shown below:

In the Specification:

Column 6, Lines 27-28 read "rounding. In another embodiment, at least part of the ~~marble chips~~ polymeric particles has one or more colors that are" and should read "rounding. In another embodiment, at least part of the polymeric particles has one or more colors that are"

Signed and Sealed this
Twenty-third Day of October, 2012

David J. Kappos
*Director of the United States Patent and Trademark Office*